Sept. 16, 1941.  B. C. PLACE  2,255,858
SECURING MOLDINGS
Filed Feb. 16, 1938
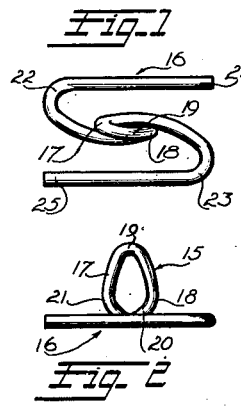
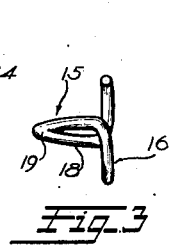
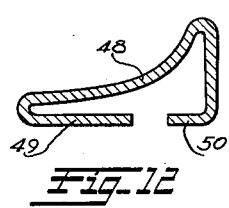
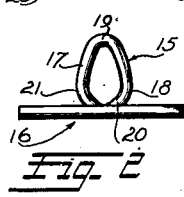
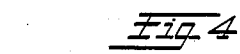
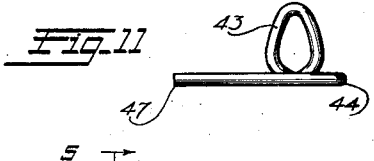
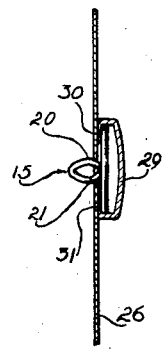
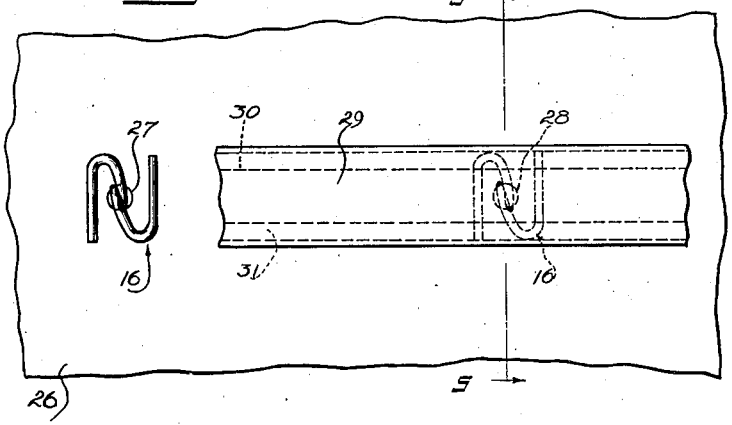
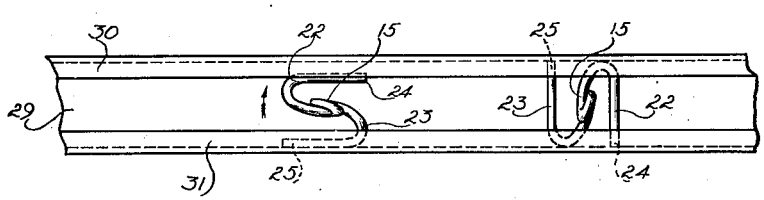
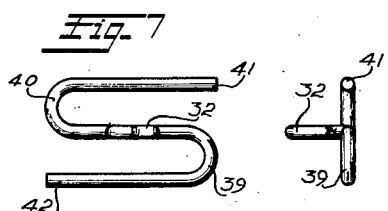
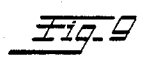
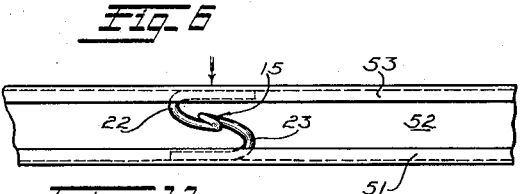
Inventor
Bion C. Place
Strauch & Hoffman
Attorneys Patented Sept. 16, 1941

2,255,858

UNITED STATES PATENT OFFICE 2,255,858

SECURING MOLDINGS

Bion C. Place, Detroit, Mich., assignor of one-half to George E. Gagnier, Detroit, Mich.

Application February 16, 1938, Serial No. 190,872

6 Claims. (Cl. 189—88)

The present invention involves an improved method and arrangement for securing trim moldings of conventional form to a sheet metallic or like support. More particularly, the invention is concerned with a fastening arrangement that holds the molding upon the supporting structure with an unusual tenacity, and to a method of readily applying the fasteners to the molding at any point along the length thereof.

A principal object of the present invention is to provide a novel association of spring stud fastener and a molding, of the type that includes a pair of inturned faced flanges, in such a way as to insure an absence of movement between the fastener and molding after the molding and fastener have been assembled, and to positively prevent inadvertent shifting of the fastener along the molding once it has been adjusted to its desired position regardless of the variations in the internal cross dimension of the molding within the tolerance limits encountered in actual practice.

A further object of the invention is to provide an improved spring stud fastener having a shank of ovoidal form and a head, at the wider end of the ovoidal shank, so shaped as to snugly fit in a hollow molding when it is applied thereto and in which the head is so shaped that free yielding of the shank adjacent the plane of the head is prevented thereby enhancing the stiffness of the shank.

Still another object of the invention is to provide a spring stud fastener having a novel form of head which permits it to be turned into wedged position between opposite walls of the molding after passage of the head between the spaced inturned flanges thereof.

A still further object of the invention is to provide a method of applying spring stud fasteners to moldings consisting in first hooking the head of the fastener under one of the molding flanges, then forcing the head past the other flange, and in finally turning it into a position in which it is wedged between opposite walls of the molding, thus avoiding application of all of the fasteners from the end of the molding though a firm non-slipping engagement is provided between the fastener head and the molding wall.

A still further object of the invention is to provide an improved spring stud fastener for securing moldings or the like that is provided with a non-circular head that is shaped to be turned into position in the molding and that has sharp corners at two diagonally opposite points of the non-circular head, which, in applied position, provide sharp points preventing slipping of the fastener along the length of the molding.

A still further object of the invention is to provide an improved one-piece wire spring stud fastener in which the shank of the fastener is constructed from the mid-portion of the piece of wire in the form of a loop, while the ends of the wire form the head, the head consisting of two oppositely opening U-shaped portions connected together by the loop constituting the shank, the arms of the U formations being disposed parallel to each other and in substantial parallelism to the plane of the loop constituting the shank.

Still further objects of the invention will appear as a description thereof proceeds with reference to the accompanying drawing, in which:

Figures 1, 2 and 3 are respectively bottom plan, side and edge views of a preferred form of spring stud fastener constituting a part of the present invention.

Figure 4 is a fragmentary plan view showing a section of a hollow molding of conventional form applied to a supporting structure by means of the improved fastener of Figures 1, 2 and 3, a part of the molding being broken away to show the fastener in holding position.

Figure 5 is a sectional view taken in the plane indicated by the line 5—5 in Figure 4 looking in the direction of the arrows.

Figure 6 is a view of a fragment of a molding looking toward the flanges thereof and showing one fastener in position to be turned into its final position, and another fastener in its final position in the molding.

Figures 7, 8 and 9 are respectively a top plan, side and edge views of a modified form of one-piece wire spring stud fastener.

Figures 10 and 11 are respectively a bottom plan and side view of a still further modified form of fastener.

Figure 12 is a sectional view of the kind of molding for which the fastener of Figures 11 and 12 is particularly adapted.

Figure 13 is a view of a fragment of a molding showing the fastener of the present invention associated therewith in another way from that illustrated in Figure 6.

Like reference characters indicate like parts throughout the several figures.

Referring to Figures 1, 2 and 3 of the drawing, a preferred form of spring stud fastener is disclosed, said fastener consisting of a shank 15 constructed from the mid-portion of the single piece of wire, and a head 16 formed from the end portions thereof. The shank 15 is constructed of ovoidal form and comprises two legs 17 and 18, which diverge gradually from a rounded nose 19 at the end of the shank. The shank also includes portions 20 and 21 which extend sharply inwardly and cross adjacent the plane of the head 16, as illustrated in the drawing. The outer surfaces of the legs 17 and 18 guide the fastener through the opening in the supporting structure presently to be referred to, and cause a contraction of the shank at such time, while the outer surfaces of the portions 20 and 21 of the shank provide relatively sharp holding shoulders engaging the inner surface of the supporting structure adjacent the opening through which the shank is passed. Preferably the portions 20 and 21 are straight from the point at which they are bent towards each other and then crossed as illustrated.

The portions 20 and 21 each carry head sections of U-shaped form 22 and 23, respectively, formed from the ends of the piece of wire of which the fastener is constructed. The arms of the U formations 22 and 23 are, as illustrated, preferably substantially parallel to each other and disposed substantially parallel to the plane of the shank. The extreme ends 24 and 25 of the piece of wire face in opposite directions as illustrated.

It will be observed that the head of the fastener just described is non-circular and provides two sharp corners, formed by the ends 24 and 25 of the piece of wire, and two rounded corners formed by the U-formations 22 and 23, the sharp corners and the rounded corners of the head being diagonally disposed.

The preferred way of using the fastener just described is illustrated in Figures 4 and 5 of the drawing, in which 26 designates a supporting structure having openings 27 and 28 for the reception of the shanks of fasteners. The fasteners secure a hollow molding 29 having inturned flanges 30 and 31 to the supporting structure 26. The inturned flanges 30 and 31 are spaced from each other. Moldings of the character illustrated in Figures 4 and 5 are well known in the art, and are applied to various parts of automobile bodies, for example, to provide a finished or ornamented appearance. In applied position the shank 15 of the fastener is disposed at the inside of the supporting structure with the shoulders provided by the portions 20 and 21 engaging the said side of the supporting structure. The shank 15 is disposed transversely of the edges of the flanges 30 and 31 and the straight portions of the head likewise extend transversely of the said flange edges as illustrated.

The fasteners are first assembled with respect to the molding, in a manner that will be clear from a consideration of Figure 6, before the molding is secured in place by snapping the protruding fastener shanks in said openings. The initial position of the fastener is shown at the left of Figure 6. In order to bring the fastener in said position, the head is arranged so that the major dimension thereof extends in the direction of the length of the molding. One side of the head is then hooked under the flange 31 as shown. The head of the fastener is then contracted, if necessary, to permit the other side to pass the edge of the flange 30, if the space between the flanges 30 and 31 does not permit free passage of this side of the head beneath the flange 30 without contraction of the head. The U-formations permit substantial contraction of the head, if necessary, as will be obvious.

After the fastener has been brought to the position shown at the left of Figure 6, it is turned in the direction indicated by the arrow appearing in said figure to bring it into the position illustrated at the right of said figure. The diagonally opposite rounded corners of the non-circular head of the fastener permit the rotation into the latter position. The fastener is so designed with reference to the inside width of the molding that, when it is in its final position, it fits very snugly between opposite walls in the molding with the ends 24 and 25 forming the sharp corners of the head of the fastener firmly engaging said walls. The fastener is then immovably held in position at the point of application to the molding, although, if necessary, by applying considerable force, it can be shifted longitudinally of the molding if required to bring the protruding shank in alignment with the opening provided to receive it.

In view of the fact that the fastener can be rotated into proper position between the flanges of the molding at any point along the length thereof, it will be understood that it is not necessary to insert all of the fasteners from one end of the molding, sliding them to the desired position from said end, as was necessary with many fasteners heretofore proposed. This is one of the distinct advantages of the fastener of the present invention. Although said fastener may be readily brought into proper position in the manner already described, once it has been turned into said position it will fixedly remain there regardless of commercial variations in the internal width of the molding at the point of application of the fastener, the fastener being designed so that the major dimension of the head thereof exceeds slightly the maximum internal width of the molding. At points of the molding which are not of the maximum width a greater force is needed to turn the fastener into position, but it can nevertheless be used in said position, because of the resilient nature of the wire from which the fastener is constructed, such resilience permitting distortion of the U-formation constituting the head of the fastener necessary to enable the fastener to be used at points of the molding at which the interior width is at a minimum.

In view of the fact that the shank of the fastener is ovoidal in form, providing sharp holding shoulders close to the head of the fastener, and in view of the fact that the legs of the loop constituting the shank cannot freely move in the plane of the head, because of engagement of portions of the head with the opposite walls of the molding, it will be understood that the fastener of the present invention possesses unusual holding power, it being necessary to flatten the sides of the loop and thus elongate the loop to enter the shank in the opening in the supporting structure provided to receive it or to withdraw it from said opening once it is engaged therein. The elongation necessary to insert the fastener can be obtained without exercising much force since the surfaces of the shank that engage the opening wall are gradually inclined. However, since sharp holding shoulders engage the opening wall when the fastener is in holding position, elongation of the loop requires the exercise of considerable force. The fastener is, therefore, capable of ready insertion though it holds with great tenacity. In view of the fact just stated, the fastener of the present invention may be constructed of wire having a relatively small diameter and it will still possess the needed holding power.

In the form of the invention illustrated in Figures 7, 8 and 9 of the drawing, the shank 32 is of ovoidal form and is constructed from the mid-portion of a single piece of wire as in the form of the invention first described. Said shank provides sharp holding shoulders 33 and 34 adjacent the head 35. The portions of the wire adjacent the sharp holding shoulders 33 and 34 in this form of the invention are bent in opposite directions, as indicated at 36 and 37 in Figure 8, to produce U-formations 39 and 40. The ends 41 and 42 of the piece of wire terminate in diagonally opposite corners of the head as in the form of the invention first described, the U-formations also providing rounded corners for the other diagonally opposite corners.

In the form of the invention illustrated in Figures 7, 8 and 9, stiffness is given to the loop constituting the shank, independently of the head, because of the fact that the bends 36 and 37 are preferably in contact with each other, no reliance being placed in this form of the invention upon the fact that the portions of the head cannot move to give added resistance to shank of the fastener. The fastener of Figures 7, 8 and 9 is used in the same manner as that first described.

In Figures 10 and 11 a further modified form of fastener is disclosed including a shank 43 constructed from the mid-portion of the single piece of wire in ovoidal form in the manner already described. The shank 43, instead of being disposed substantially centrally of the head of the fastener as in the forms of the invention first described, is disposed eccentrically of the head, this being accomplished by making the U-bend 44 of one of the head sections close to the shank while the other U-bend 45 is made at a point more remotely spaced from the shank 43. The ends 46 and 47 of the wire are arranged so as to be disposed on lines tangent to the U-bends 44 and 45 as in the forms of the invention already described.

The form of the invention illustrated in Figures 10 and 11 may be used with a molding having a section such as that illustrated in Figure 12, that is, a molding comprising a body 48 and spaced inturned flanges 49 and 50, the flange 49 being relatively long compared to the flange 50. Moldings of this character are frequently used in corners and in order that the head of the fastener may engage opposite walls of such moldings it is desirable that the shank be eccentrically arranged. The fastener of Figures 10 and 11 is well adapted to secure such a molding as illustrated in Figure 12, the formation of the head of the fastener of the present invention readily permitting variations, such as that just described to meet the actual conditions encountered in securing moldings of various types by means of spring stud fasteners.

If desired, the fastener of the present invention, which has, in effect, an S-shaped head, can be inserted in the molding without rotation, especially if the inturned molding flanges are short with relatively widely spaced edges. Figure 13 illustrates the final position of a fastener so inserted. It will be observed that the arms of the U-formations 22 and 23 extend parallel to the edges of the molding flanges. The fastener is applied to the molding by first hooking one side under one of the flanges, such as the flange 51 of molding 52. Pressure is then exerted against the opposite side of the fastener head in the direction of the arrow on Figure 13 to contract the head and permit it to be sprung past the flange 53 of the molding. The head then again expands toward its normal form after it has passed said flange and firmly engages the inside molding wall. The normal width of the fastener head normally exceeds the inside cross width of the molding so that when the fastener is in place its head is under contraction. The fastener is thus firmly held from movement longitudinally of the molding.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a supporting structure having an opening, a hollow molding disposed on said structure over said opening, and a spring fastener securing said molding to said structure and including a shank in the form of an elongated loop formed from the mid-portion of a piece of wire and sprung in said opening, said fastener having a head including two widely spaced parallel straight portions disposed at the sides of said shank and formed from the ends of said piece of wire and extending transversely across said molding from one wall to an opposite wall and in firm contact with said walls, said straight portions being perpendicular to said walls.

2. In combination, a supporting structure having an opening, a hollow molding disposed on said structure over said opening, and a spring fastener securing said molding to said structure and including a shank in the form of an elongated loop formed from the mid-portion of a piece of wire and sprung in said opening, said fastener having a head including two widely spaced parallel straight portions disposed at the sides of said shank and formed from the ends of said piece of wire and extending in a perpendicular direction across said molding from one wall to an opposite wall with the wire tips in firm contact with said walls, and curved portions connecting said straight portions with the sides of the loop of said shank respectively.

3. A one-piece wire spring stud fastener, comprising in unstressed condition a shank in the form of a loop formed from the mid-portion of said piece of wire, and a four-cornered head consisting of two oppositely-opening U-shaped portions connected together by said shank, the outer arms of said U-formations being disposed in substantial parallelism to each other and approximately parallel to the plane of said shank.

4. In combination, a supporting structure having an opening, a hollow molding disposed on said structure over said opening, and a spring fastener securing said molding to said structure and including a shank of ovoidal shape formed from the mid-portion of a piece of wire and sprung in said opening so that the wider party of the ovoidal shank is disposed adjacent said structure, said fastener having a head including two spaced continuous straight portions each of which is disposed transversely across said molding in a direction perpendicular to a longitudinal molding wall and snugly fitting between opposite parallel walls of said molding.

5. In combination, a supporting structure having openings, a molding having spaced inturned flanges disposed on said structure over said openings, and spring stud fasteners having shanks in the form of wire loops sprung in said openings with the planes of the loops disposed transversely of the edges of said flanges, and heads wedged between opposite walls of said molding, said heads being four-cornered, each head having two diagonally-opposite rounded corners and two diagonally-opposite sharp corners connected by straight portions including the ends of a piece of wire, said portions extending between opposite walls of the molding in perpendicular relation thereto.

6. In combination, a supporting structure having openings, a molding having spaced inturned flanges disposed on said structure over said openings, and spring stud fasteners having shanks in the form of wire loops sprung in said openings with the planes of the loops disposed transversely of the edges of said flanges, and heads wedged between opposite walls of said molding, each head including two wire ends disposed perpendicular to said walls and each extending straight across said molding from one wall to an opposite wall and yieldingly urged against opposite walls thereof to resist shifting of the fastener lengthwise of the molding.

BION C. PLACE.